Feb. 10, 1925.
J. WAGENAAR
1,525,524
PAN LIFTER
Filed April 30, 1924
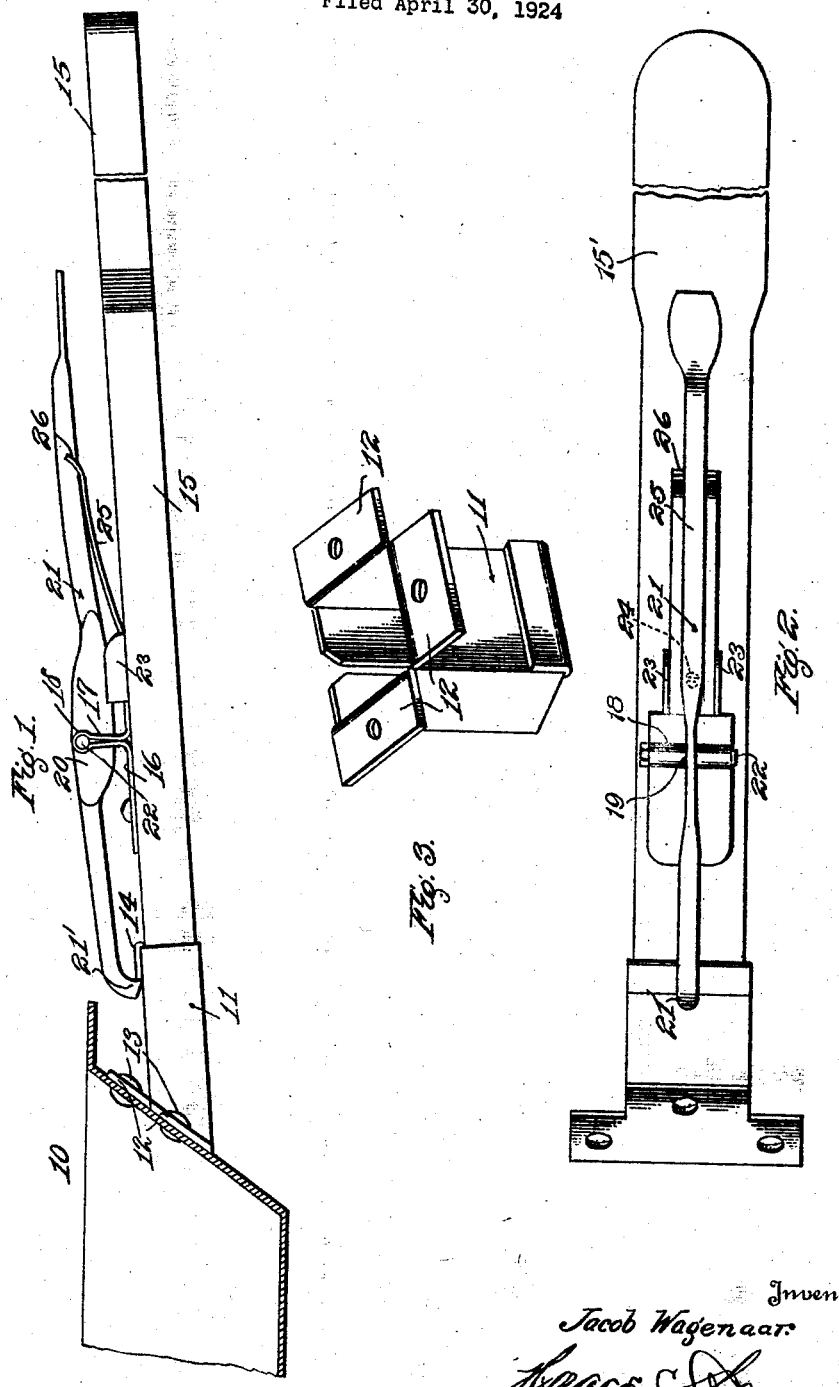
Inventor
Jacob Wagenaar
By
Attorney Patented Feb. 10, 1925.

1,525,524

UNITED STATES PATENT OFFICE.

JACOB WAGENAAR, OF ORANGE CITY, IOWA.

PAN LIFTER.

Application filed April 30, 1924. Serial No. 710,053.

*To all whom it may concern:*

Be it known that I, JACOB WAGENAAR, a citizen of the United States, residing at Orange City, in the county of Sioux, State of Iowa, have invented certain new and useful Improvements in Pan Lifters; and I do hereby declare the following to be a full, clear, and exact description of the invention, such as will enable others skilled in the art to which it appertains to make and use the same.

This invention relates to new and useful improvements in kitchen utensils, and particularly to devices for lifting pots and pans, when hot.

One object of the invention is to provide a handle device for pots and pans which can be easily and quickly detached, and readily applied, whereby such pans as pie pans, bake pans, and the like, may be lifted into and out of an oven with ease and without danger of burning the hands.

Another object is to provide a comparatively long handle for pie pans, bake pans, and the like, which will permit easy manipulation of the pans, but permit the pans to be placed in the oven without occupying any more space than the ordinary pans of this type.

A further object is to provide a detachable handle which, when properly engaged with means on the pan, will be firmly held in such position to permit the pan being lifted and carried to and from a stove.

Other objects and advantages will be apparent from the following description when taken in connection with the accompanying drawing.

In the drawing:

Figure 1 is a side elevation of a fragment of a pan, showing the handle applied thereto.

Figure 2 is a top plan view of the same.

Figure 3 is a perspective view of the pan attached socket member, removed from the pan.

Referring particularly to the accompanying drawing, 10 represents a portion of a pie pan, the side wall of which is inclined, as usual, and secured to the outer face of this wall of the pan is an angular tubular member 11, the same having the apertured ears 12 which receive the rivets 13, by means of which said ears are secured to the pan. The upper edge portion of the outer open end of the member 11 is turned back onto the upper wall of said member, as shown at 14, to form a stop, as will be later explained herein.

The removable handle includes the shank 15, on the outer end of which is formed the hand grip 15′, while the other, or inner end, is arranged to be snugly received in the tubular member 11. Secured to the upper face of the shank 15 is a metal plate 16, and rising from the intermediate portion of this plate is a web 17, the upper end of which is formed with a tubular bearing 18. The intermediate portion of the bearing 18, and adjacent portion of the web 17, are formed with a slit 19 in which is received the flat intermediate portion 20, of the detent lever 21. A pivot pin 22 is passed through the tubular bearing 18, and through the said flat portion of the lever 21, whereby said lever is pivotally supported. Formed on the rear end of the plate 16, and bent upwardly into parallel relation, are two wings 23, and between these wings, and secured in place by the screw 24, which engages through this end of the plate, is the inner end of a leaf spring 25. The other end of the spring 25 is bifurcated, as shown at 26, and engages with, and presses upwardly on, the outer end portion of the lever 21, said end portion of the lever being flattened for engagement thereon of the thumb of the operator. The other end of the lever 21 is turned inwardly toward the shank, as shown at 21′, with the lower face of said end beveled to permit the end to ride over the portion 14 and to snap therebehind, while the adjacent portion of the shank snugly fits within the tubular member 11. To release the handle from the member 14, it is only necessary to depress the lever 21 with the thumb, when the other end of the lever will be raised above the portion 14, whereupon the shank may be withdrawn from the member 14.

By this construction, pie pans and bake pans, which are ordinarily placed in and removed from an oven by means of pads, or specially devised cloths, may be provided with long handles, which render the lifting and carrying the pans easy, and without danger of dropping the same, or burning the hands. The spring 25 resiliently urges the handle end of the lever 21 away from the shank while the other end contacts with the face of the shank, and by reason of the bevel of the inturned end of the lever, it is only necessary to push the lever into the member 14, whereupon the beveled end will ride over the portion 14, and snap onto the upper face of the said member and behind said portion.

What is claimed is:

The combination with a pan having a socket member provided with a projection, of a handle for lifting the pan including a shank, a bearing member mounted on the shank and having a central notch and a transverse pin extending through the notch, a leaf spring extending rearwardly from and formed integrally with the bearing member, and a lever mounted on said pin within the notch and having one end provided with a hook for engagement with the said projection when said shank is inserted in the socket member, said lever having its other end normally urged away from the shank by the said leaf spring.

In testimony whereof, I affix my signature, in the presence of two witnesses.

JACOB WAGENAAR.

Witnesses:
T. E. KLAY,
GENET KLAY.